(12) United States Patent
Yen et al.

(10) Patent No.: US 8,131,649 B2
(45) Date of Patent: Mar. 6, 2012

(54) STATIC-OR-DYNAMIC AND LIMITED-OR-UNLIMITED CONTENT RIGHTS

(75) Inventors: Wei Yen, Los Altos Hills, CA (US);
David Blythe, San Carlos, CA (US);
John Princen, Cupertino, CA (US);
Pramila Srinivasan, Palo Alto, CA (US)

(73) Assignee: iGware, Inc., Mountain View, CA (US)

( * ) Notice: Subject to any disclaimer, the term of this patent is extended or adjusted under 35 U.S.C. 154(b) by 1046 days.

(21) Appl. No.: 10/703,149

(22) Filed: Nov. 5, 2003

(65) Prior Publication Data
US 2005/0038753 A1   Feb. 17, 2005

Related U.S. Application Data

(63) Continuation-in-part of application No. 10/360,827, filed on Feb. 7, 2003, now Pat. No. 7,322,042.

(51) Int. Cl.
*G06F 21/00* (2006.01)
(52) U.S. Cl. .......................................................... 705/59
(58) Field of Classification Search .............. 705/50–59; 463/1–69; 725/133, 141, 153
See application file for complete search history.

(56) References Cited

U.S. PATENT DOCUMENTS

| | | | |
|---|---|---|---|
| 5,095,798 A | 3/1992 | Okada et al. | |
| 5,184,830 A | 2/1993 | Okada et al. | |
| 5,238,250 A * | 8/1993 | Leung et al. | 463/24 |
| 5,261,069 A | 11/1993 | Wilkinson et al. | |
| 5,367,698 A | 11/1994 | Webber et al. | |
| 5,400,402 A | 3/1995 | Garfinkle | |
| 5,404,505 A | 4/1995 | Levinson | |
| 5,426,763 A | 6/1995 | Okada | |
| 5,528,513 A | 6/1996 | Vaitzblit et al. | |
| 5,577,209 A | 11/1996 | Boyle et al. | |
| 5,586,264 A | 12/1996 | Belknap et al. | |
| 5,590,199 A | 12/1996 | Krajewski, Jr. et al. | |
| 5,610,839 A | 3/1997 | Karolak et al. | |

(Continued)

FOREIGN PATENT DOCUMENTS

DE         20014381         11/2000

(Continued)

OTHER PUBLICATIONS

Arbaugh, William A., et al., "A Secure and Reliable Bootstrap Architecture," University of Pennsylvania (1996).

(Continued)

*Primary Examiner* — Mary Cheung
(74) *Attorney, Agent, or Firm* — Sheppard Mullin Richter & Hampton LLP

(57) ABSTRACT

Dynamic assignment of rights to content, such as in a closed distribution system. Noting state information generated by an item of current content, and modifying state or rights of new content in response. Pre-loading or dynamically sending new content to the owner of the current content, with rights being enabled only at a later time, in the playback device, with predetermined conditions. In response to current state information, dynamically sending a license for new content from a server. Conditional or dynamic licenses to new content, including a set of rights associated with a class of possible sets of state information. Assignment of limited rights to a content, with support in a secure player to enforce them; for purposes of rental, bonus content, trials and other business models.

38 Claims, 3 Drawing Sheets

U.S. PATENT DOCUMENTS

| | | | |
|---|---|---|---|
| 5,638,443 | A | 6/1997 | Stefik et al. |
| 5,715,398 | A | 2/1998 | Lubenow et al. |
| 5,715,403 | A | 2/1998 | Stefik |
| 5,765,152 | A * | 6/1998 | Erickson ............................ 707/9 |
| 5,781,901 | A | 7/1998 | Kuzma |
| 5,786,587 | A | 7/1998 | Colgate, Jr. |
| 5,790,170 | A | 8/1998 | Suzuki |
| 5,799,086 | A | 8/1998 | Sudia |
| 5,805,712 | A | 9/1998 | Davis |
| 5,809,242 | A | 9/1998 | Shaw et al. |
| 5,815,662 | A | 9/1998 | Ong |
| 5,818,512 | A | 10/1998 | Fuller |
| 5,829,046 | A | 10/1998 | Tzelnic et al. |
| 5,867,223 | A | 2/1999 | Schindler et al. |
| 5,892,900 | A | 4/1999 | Ginter et al. |
| 5,903,723 | A | 5/1999 | Beck et al. |
| 5,905,860 | A | 5/1999 | Olsen et al. |
| 5,909,491 | A | 6/1999 | Luo |
| 5,913,039 | A | 6/1999 | Nakamura et al. |
| 5,933,498 | A * | 8/1999 | Schneck et al. .................. 705/54 |
| 5,983,227 | A | 11/1999 | Nazem et al. |
| 6,014,558 | A | 1/2000 | Thomas |
| 6,016,348 | A | 1/2000 | Blatter et al. |
| 6,029,046 | A | 2/2000 | Khan et al. |
| 6,032,200 | A | 2/2000 | Lin |
| 6,038,601 | A | 3/2000 | Lambert et al. |
| 6,044,157 | A | 3/2000 | Useaka et al. |
| 6,049,821 | A | 4/2000 | Theriault et al. |
| 6,052,720 | A | 4/2000 | Traversat et al. |
| 6,085,193 | A | 7/2000 | Malkin et al. |
| 6,141,756 | A | 10/2000 | Bright et al. |
| 6,148,340 | A | 11/2000 | Bittinger et al. |
| 6,157,721 | A | 12/2000 | Shear et al. |
| 6,167,441 | A | 12/2000 | Himmel |
| 6,185,625 | B1 | 2/2001 | Tso et al. |
| 6,195,433 | B1 | 2/2001 | Vanstone et al. |
| 6,205,475 | B1 | 3/2001 | Pitts |
| 6,212,657 | B1 | 4/2001 | Wang et al. |
| 6,219,680 | B1 | 4/2001 | Bernardo et al. |
| 6,219,708 | B1 | 4/2001 | Martenson |
| 6,226,618 | B1 * | 5/2001 | Downs et al. ..................... 705/1 |
| 6,243,719 | B1 | 6/2001 | Ikuta et al. |
| 6,256,637 | B1 | 7/2001 | Venkatesh et al. |
| 6,259,471 | B1 | 7/2001 | Peters et al. |
| 6,278,782 | B1 | 8/2001 | Ober et al. |
| 6,289,452 | B1 * | 9/2001 | Arnold et al. .................. 713/175 |
| 6,292,899 | B1 | 9/2001 | McBride |
| 6,310,956 | B1 | 10/2001 | Morito et al. |
| 6,321,209 | B1 | 11/2001 | Pasquali |
| 6,330,566 | B1 | 12/2001 | Durham |
| 6,338,050 | B1 | 1/2002 | Conklin et al. |
| 6,371,854 | B1 | 4/2002 | Ikeda et al. |
| 6,377,972 | B1 | 4/2002 | Guo et al. |
| 6,389,460 | B1 | 5/2002 | Stewart et al. |
| 6,389,538 | B1 | 5/2002 | Grsue et al. |
| 6,397,186 | B1 | 5/2002 | Bush et al. |
| 6,412,008 | B1 | 6/2002 | Fields et al. |
| 6,412,011 | B1 | 6/2002 | Agraharam et al. |
| 6,427,238 | B1 | 7/2002 | Goodman et al. |
| 6,442,691 | B1 | 8/2002 | Blandford |
| 6,446,113 | B1 | 9/2002 | Ozzie et al. |
| 6,466,048 | B1 | 10/2002 | Goodman |
| 6,480,883 | B1 | 11/2002 | Tsutsumitake |
| 6,500,070 | B1 | 12/2002 | Tomizawa et al. |
| 6,510,502 | B1 | 1/2003 | Shimizu |
| 6,526,581 | B1 | 2/2003 | Edson |
| 6,544,126 | B2 | 4/2003 | Sawano et al. |
| 6,557,104 | B2 | 4/2003 | Vu et al. |
| 6,571,279 | B1 | 5/2003 | Herz et al. |
| 6,574,605 | B1 | 6/2003 | Sansders et al. |
| 6,594,682 | B2 | 7/2003 | Peterson et al. |
| 6,606,644 | B1 | 8/2003 | Ford et al. |
| 6,637,029 | B1 | 10/2003 | Maissel et al. |
| 6,654,388 | B1 | 11/2003 | Lexenberg et al. |
| 6,669,096 | B1 | 12/2003 | Saphar et al. |
| 6,675,350 | B1 | 1/2004 | Abrams et al. |
| 6,691,312 | B1 | 2/2004 | Sen et al. |
| 6,697,948 | B1 | 2/2004 | Rabin et al. |
| 6,704,797 | B1 | 3/2004 | Fields et al. |
| 6,711,553 | B1 | 3/2004 | Deng et al. |
| 6,751,729 | B1 | 6/2004 | Giniger et al. |
| 6,760,324 | B1 | 7/2004 | Scott et al. |
| 6,785,712 | B1 | 8/2004 | Hogan et al. |
| 6,805,629 | B1 * | 10/2004 | Weiss ............................. 463/16 |
| 6,811,486 | B1 * | 11/2004 | Luciano, Jr. .................... 463/24 |
| 6,826,593 | B1 | 11/2004 | Acharya et al. |
| 6,832,241 | B2 | 12/2004 | Tracton et al. |
| 6,859,535 | B1 | 2/2005 | Tatebayashi et al. |
| 6,873,975 | B1 | 3/2005 | Hatakeyama et al. |
| 6,901,386 | B1 | 5/2005 | Dedrick et al. |
| 6,920,567 | B1 | 7/2005 | Doherty |
| 6,928,551 | B1 | 8/2005 | Lee et al. |
| 6,938,021 | B2 | 8/2005 | Shear et al. |
| 6,948,070 | B1 | 9/2005 | Ginter et al. |
| 6,993,557 | B1 | 1/2006 | Yen |
| 7,020,480 | B2 | 3/2006 | Coskun et al. |
| 7,024,394 | B1 | 4/2006 | Ashour et al. |
| 7,039,708 | B1 | 5/2006 | Knobl et al. |
| 7,051,212 | B2 | 5/2006 | Ginter et al. |
| 7,062,500 | B1 | 6/2006 | Hall et al. |
| 7,069,451 | B1 | 6/2006 | Ginter et al. |
| 7,092,953 | B1 | 8/2006 | Haynes |
| 7,099,479 | B1 | 8/2006 | Ishibashi et al. |
| 7,120,802 | B2 | 10/2006 | Shear et al. |
| 7,124,304 | B2 | 10/2006 | Bel et al. |
| 7,130,829 | B2 | 10/2006 | Banerjee et al. |
| 7,134,144 | B2 | 11/2006 | McKune |
| 7,143,290 | B1 | 11/2006 | Ginter et al. |
| 7,228,437 | B2 | 6/2007 | Spagna et al. |
| 7,237,123 | B2 | 6/2007 | LeVine et al. |
| 7,322,042 | B2 | 1/2008 | Srinivasan et al. |
| 7,330,717 | B2 | 2/2008 | Gidron et al. |
| 7,380,275 | B2 | 5/2008 | Srinivasan et al. |
| 7,415,620 | B2 | 8/2008 | England et al. |
| 7,636,843 | B1 | 12/2009 | Asano et al. |
| 7,644,429 | B2 | 1/2010 | Bayassi et al. |
| 2001/0014882 | A1 * | 8/2001 | Stefik et al. ..................... 705/51 |
| 2001/0026287 | A1 | 10/2001 | Watanabe |
| 2001/0036292 | A1 | 11/2001 | Levy et al. |
| 2002/0016818 | A1 | 2/2002 | Kirani et al. |
| 2002/0032784 | A1 | 3/2002 | Darago et al. |
| 2002/0049909 | A1 | 4/2002 | Jackson et al. |
| 2002/0057799 | A1 | 5/2002 | Kohno |
| 2002/0059384 | A1 | 5/2002 | Kaars |
| 2002/0071557 | A1 | 6/2002 | Nguyen |
| 2002/0085720 | A1 | 7/2002 | Okada et al. |
| 2002/0095382 | A1 | 7/2002 | Taoka et al. |
| 2002/0108028 | A1 | 8/2002 | Nunoe |
| 2002/0116615 | A1 | 8/2002 | Nguyen et al. |
| 2002/0137566 | A1 | 9/2002 | Tomizawa et al. |
| 2002/0138764 | A1 | 9/2002 | Jacobs et al. |
| 2002/0154799 | A1 | 10/2002 | Anderson et al. |
| 2002/0160833 | A1 * | 10/2002 | Lloyd et al. ..................... 463/29 |
| 2002/0161673 | A1 | 10/2002 | Lee et al. |
| 2002/0161996 | A1 | 10/2002 | Koved et al. |
| 2002/0162115 | A1 * | 10/2002 | Bruckner et al. .............. 725/105 |
| 2002/0165022 | A1 | 11/2002 | Hiraoka |
| 2002/0165028 | A1 | 11/2002 | Miyamoto et al. |
| 2002/0169974 | A1 | 11/2002 | McKune |
| 2002/0183045 | A1 | 12/2002 | Emmerson et al. |
| 2002/0184160 | A1 | 12/2002 | Tadayon et al. |
| 2003/0004888 | A1 | 1/2003 | Kambayashi et al. |
| 2003/0009423 | A1 | 1/2003 | Wang et al. |
| 2003/0023427 | A1 | 1/2003 | Cassin et al. |
| 2003/0023564 | A1 | 1/2003 | Padhye et al. |
| 2003/0028622 | A1 * | 2/2003 | Inoue et al. ................... 709/219 |
| 2003/0045355 | A1 | 3/2003 | Comair |
| 2003/0114227 | A1 * | 6/2003 | Rubin ............................. 463/43 |
| 2003/0120541 | A1 | 6/2003 | Siann et al. |
| 2003/0140241 | A1 | 7/2003 | England et al. |
| 2003/0144869 | A1 | 7/2003 | Fung et al. |
| 2003/0157985 | A1 | 8/2003 | Shteyn |
| 2003/0166398 | A1 | 9/2003 | Netanel |
| 2003/0182142 | A1 | 9/2003 | Valenzuela et al. |
| 2003/0220142 | A1 | 11/2003 | Siegel |
| 2004/0015426 | A1 | 1/2004 | Tadayon et al. |
| 2004/0039929 | A1 | 2/2004 | Decime |

| | | | |
|---|---|---|---|
| 2004/0044901 | A1 | 3/2004 | Serkowski |
| 2004/0054923 | A1 | 3/2004 | Seago et al. |
| 2004/0083388 | A1 | 4/2004 | Nguyen |
| 2004/0098297 | A1 | 5/2004 | Borthwick |
| 2004/0098580 | A1 | 5/2004 | DeTreville |
| 2004/0098610 | A1 | 5/2004 | Hrastar |
| 2004/0102987 | A1 | 5/2004 | Takahashi et al. |
| 2004/0116119 | A1 | 6/2004 | Lewis et al. |
| 2005/0004875 | A1 | 1/2005 | Konito et al. |
| 2005/0038753 | A1 | 2/2005 | Yen et al. |
| 2005/0071640 | A1 | 3/2005 | Sprunk et al. |
| 2005/0097618 | A1 | 5/2005 | Arling et al. |
| 2005/0122977 | A1 | 6/2005 | Lieberman |
| 2005/0232284 | A1 | 10/2005 | Karaoguz et al. |
| 2006/0026691 | A1 | 2/2006 | Kim et al. |
| 2006/0031222 | A1 | 2/2006 | Hannsmann |
| 2006/0080529 | A1 | 4/2006 | Yoon et al. |
| 2006/0090084 | A1 | 4/2006 | Buer |
| 2006/0129848 | A1 | 6/2006 | Paksoy et al. |
| 2006/0136570 | A1 | 6/2006 | Pandya |
| 2006/0153368 | A1 | 7/2006 | Beeson |
| 2006/0236122 | A1 | 10/2006 | Field et al. |
| 2007/0005504 | A1 | 1/2007 | Chen et al. |
| 2007/0016832 | A1 | 1/2007 | Weiss |
| 2007/0067826 | A1 | 3/2007 | Conti |
| 2007/0150730 | A1 | 6/2007 | Conti |
| 2008/0096608 | A1 | 4/2008 | Wendling |
| 2008/0275750 | A1 | 11/2008 | Robinson et al. |

FOREIGN PATENT DOCUMENTS

| | | |
|---|---|---|
| EP | 0961193 | 12/1999 |
| EP | 0 992 922 A1 | 4/2000 |
| EP | 0992922 A2 | 4/2000 |
| EP | 1061516 | 12/2000 |
| EP | 1 091 274 A2 | 4/2001 |
| EP | 1091274 A2 | 4/2001 |
| EP | 1091274 A2 * | 4/2001 |
| EP | 1883031 | 1/2008 |
| GB | 2341523 | 3/2000 |
| JP | 10-207779 A | 8/1998 |
| JP | 11-203127 A | 7/1999 |
| JP | 2000508940 | 7/2000 |
| JP | 2001-195077 A | 7/2001 |
| JP | 2001340646 | 12/2001 |
| JP | 2002024178 A | 1/2002 |
| JP | 2002024178 A1 | 1/2002 |
| JP | 2002-373080 A | 12/2002 |
| JP | 2003-6171 A | 1/2003 |
| JP | 2003-030157 | 1/2003 |
| WO | WO97/39811 | 10/1997 |
| WO | WO00/50978 | 8/2000 |
| WO | 00/59151 A2 | 10/2000 |
| WO | WO02/29642 A2 | 4/2002 |
| WO | WO02/30088 A1 | 4/2002 |
| WO | WO-0229642 A2 | 4/2002 |
| WO | WO-0230088 A1 | 4/2002 |
| WO | WO03-005145 | 1/2003 |

OTHER PUBLICATIONS

Aziz, Ashar, et al., "Privacy and Authentication for Wireless Local Area Networks," Sun Microsystems, Inc., (1993).
Davids, George I., et al., "Defending Systems Against Viruses through Cryptographic Authentication," IEEE pp. 312-318 (1989).
Diffie, Whitfield, "The First Ten Years of Public-Key Cryptography," Proceedings of the IEEE, vol. 96, No. 5, pp. 560-577 (May 1988).
Diffie, Whitfield, et al., "New Directions in Cryptography," (1976).
Dyer, Joan G., et al., "Building the IBM 4758 Secure Coprocessor," Computer, pp. 2-12 (Oct. 2001).
Frantzen, Mike, et al., "StackGhost: Hardware Facilitated Stack Protection," Proceedings of the $10^{th}$ USENIX Security Symposium (2001).
Fujimura, Ko., et al., "Digital-Ticket-Controlled Digital Ticket Circulation," Proceedings of the $8^{th}$ USENIX Security Symposium (1999).
Gligor, Virgil D., "20 Years of Operating Systems Security," University of Maryland.
Gutmann, Peter, "The Design of a Cryptographic Security Architecture," Proceedings of the $8^{th}$ USENIX Security Symposium (1999).
Itoi, Naomaru, "SC-CFS: Smartcard Secured Cryptographic File System," Proceedings of the $10^{th}$ USENIX Security Symposium (2001).
Jaeger, Trent, et al., "Building Systems that Flexibly Control Downloaded Executable Context," Proceedings of the $6^{th}$ USENIX UNIX Security Symposium (1996).
Karger, Paul A., "New Methods for Immediate Revocation," IEEE (1989).
Kogan, Noam, et al., "A Practical Revocation Scheme for Broadcast Encryption Using Smart Cards," Proceedings of the 2003 IEEE Symposium on Security and Privacy (2003).
Lampson, Butler, et al., "Authentication in Distributed Systems." Theory and Practice, Digital Equipment Corporation (1992).
Lotspiech, Jeffrey, et al., "Broadcast Encryption's Bright Future," Computer, pp. 57-63 (Aug. 2002).
Lotspiech, Jeffrey, et al., "Anonymous Trust: Digital Rights Management Using Broadcast Encryption," Proceedings of the IEEE, vol. 92, No. 6, pp. 898-909 (Jun. 2004).
Monrose, et al., "Toward Speech-Generated Cryptographic Keys on Resource Constrained Devices," Proceedings of the $11^{th}$ USENIX Security Symposium (2002).
Neumann, P.G., et al., "A Provably Secure Operating System," Stanford Research Institute (1975).
Palmer, Elaine R., "An Introduction to Citadel—A Secure Crypto Coprocessor for Workstations," IBM Research Division (1992).
Peterson, David S., et al., "A Flexible Containment Mechanism for Executing Untrusted Code," Proceedings of the $11^{th}$ USENIX Security Symposium (2002).
Rubin, Aviel D., "Trusted Distribution of Software Over the Internet," Internet Society 1995 Symposium on Network and Distributed System Security.
Smith, Sean W., "Secure Coprocessing Applications and Research Issues," Los Alamos Unclassified Release LA-UR-96-2805 (1996).
Smith, Sean W., et al., "Building a High-Performance, Programmable Secure Coprocessor," Secure Systems and Smart Cards, IBM T.J. Watson Research Center, NY (1998).
Smith, Sean W., et al., "Using a High-Performance, Programmable Secure Coprocessor," Proceedings of the Second International Conference on Financial Cryptography.
Smith, Sean, et al., "Validating a High-Performance, Programmable Secure Coprocessor," Secure Systems and Smart Cards, IBM T.J. Watson Research Center, NY.
Stefik, Mark, "Trusted Systems," Scientific American, pp. 78-81 (Mar. 1997).
Tygar, J.D., et al., "Strongbox: A System for Self-Securing Programs," pp. 163-197.
Tygar, J.D. et al., "Dyad: A System for Using Physically Secure Coprocessors," School of Computer Science, Carnegie Mellon University (1991).
Van Doorn, Leendert, "A Secure Java™ Virtual Machine," Proceedings of the $9^{th}$ USENIX Security Symposium (2000).
White, et al., "ABYSS: An Architecture for Software Protection," IEEE Transactions on Software Engineering, vol. 16, No. 6, pp. 619-629(1990).
White, Steve R., et al., "Introduction to the Citadel Architecture: Security in Physically Exposed Environments," IBM Research Division (1991).
Wobber, Edward, et al., "Authentication in the Taso Operating System," Digital Systems Research Center (1993).
Yee, B., et al., "Secure Coprocessors in Electronic Commerce Applications," Proceedings of the First USENIX Workshop on Electronic Commerce (1995).
Yee, B., "Using Secure Coprocessors," PhD Thesis, School of Computer Science, Carnegie Mellon University, Pittsburgh, PA (1994).
Nonnenmacher, Jorg et al., "Asynchronous Multicast Push: AMP." $13^{th}$ International Conference on Computer Commnication, Nov. 18-21, 1997, pp. 419-430, 13, Proceedings of International Conference on Computer Communication, Cannes.
Rodriguez, Pablo et al. Improving the WWW: Caching or Multicast? Computer Networks and ISDN Systems. Nov. 25, 1998, 30(22-23):2223-2243.

Wang, Zheng et al. "Prefetching in World Wide Web." Global TeleCommnications Conference, Nov. 18-22, 1996, pp. 28-32, London.

Bharadvaj et al., Proceedings of the 17$^{th}$ IEEE Symposium on Reliable Distributed Systems, pp. 118-123 (1998).

Hori et al., *Computer Networks*, 33(1-6):197-211 (2000).

Traylor, Scott, "Graphic Resolution and File Sizes", http://www.traylormm.com/harvard/53graphicresolution/.

Neboyskey, "A leap Forward: Why States Should Ratify the Uniform Computer Information Transaction Act", May 2000, Federal Communications Law Journal, v52n3, pp. 793-820.

Kent, Stephen Thomas, "Protecting Externally Supplied Software in Small Computers," Massachusetts Institute of Technology (1980).

Game Boy, <http://en.wikipedia.org/wiki/Game_Boy_Advanced> Accessed Mar. 30, 2008.

Game Boy Advance, <http://en.wikipedia.org/wiki/Game_Boy_Advanced> Accessed Mar. 30, 2008.

Game Cube, <http://en.wikipedia.org/wiki/Game_Cube> Accessed Mar. 28, 2008.

Dodson, David A, "Gain Some Perspective With Innovation's GBA to TV Converter" Jun. 6, 2002, http://www.viewonline.com/page/articles/innovationsGBATV.htm>, Accessed Mar. 29, 2008.

International Search Report of PCT Application No. PCT/US04/03413, Jun. 22, 2007, 2 pages.

Written Opinion of PCT Application No. PCT/US04/03413, Jun. 22, 2007, 3 pages.

International Search Report of PCT Application No. PCT/US04/37050, Jun. 14, 2005, 1 page.

Written Opinion of PCT Application No. PCT/US04/37050, Jun. 14, 2005, 3 pages.

International Search Report of PCT Application No. PCT/US2004/040486, May 8, 2007, 1 page.

Written Opinion of PCT Application No. PCT/US2004/040486, May 8, 2007, 8 pages.

International Search Report of PCT Application No. PCT/US2007/010797, Aug. 5, 2008, 1 page.

Written Opinion of PCT Application No. PCT/US2007/010797, Aug. 5, 2008, 3 pages.

International Search Report of PCT Application No. PCT/US2007/010601, Apr. 24, 2008, 1 page.

Written Opinion of PCT Application No. PCT/US2007/010601, Apr. 24, 2008, 4 pages.

International Search Report of PCT Application No. PCT/US07/19862, May 28, 2008, 1 page.

Written Opinion of PCT Application No. PCT/US07/19862, May 28, 2008, 6 pages.

International Search Report of PCT Application No. PCT/US2007/020074, Oct. 8, 2008, 3 pages.

Written Opinion of PCT Application No. PCT/US2007/020074, Oct. 8, 2008, 6 pages.

Co-pending U.S. Appl. No. 10/360,827, filed Feb. 7, 2003.
Co-pending U.S. Appl. No. 11/048,515, filed Jan. 31, 2005.
Co-pending U.S. Appl. No. 10/463,224, filed Jun. 16, 2003.
Co-pending U.S. Appl. No. 11/203,357, filed Aug. 12, 2005.
Co-pending U.S. Appl. No. 11/203,358, filed Aug. 12, 2005.
Co-pending U.S. Appl. No. 12/330,487, filed Dec. 8, 2008.
Co-pending U.S. Appl. No. 10/727,332, filed Dec. 2, 2003.
Co-pending U.S. Appl. No. 11/416,361, filed May 1, 2006.
Co-pending U.S. Appl. No. 12/281,977, filed Jul. 13, 2009.
Co-pending U.S. Appl. No. 11/586,446, filed Oct. 24, 2006.
Co-pending U.S. Appl. No. 12/576,243, filed Oct. 9, 2009.
Co-pending U.S. Appl. No. 11/601,323, filed Nov. 16, 2006.
Co-pending U.S. Appl. No. 12/576,344, filed Oct. 9, 2009.
Co-pending U.S. Appl. No. 12/576,356, filed Oct. 9, 2009.
Co-pending U.S. Appl. No. 12/576,904, filed Oct. 9, 2009.
Co-pending U.S. Appl. No. 12/507,050, filed Jul. 21, 2009.

Notice of Allowance Mailed Aug. 28, 2007 in Co-Pending U.S. Appl. No. 10/360,827, filed Feb. 7, 2003.
Final Office Action Mailed Mar. 8, 2007 in Co-Pending U.S. Appl. No. 10/360,827, filed Feb. 7, 2003.
Non-Final Office Action Mailed Sep. 7, 2006 in Co-Pending U.S. Appl. No. 10/360,827, filed Feb. 7, 2003.
Notice of Allowance Mailed Dec. 20, 2007 in Co-Pending U.S. Appl. No. 11/048,515, filed Jan. 31, 2005.
Non-Final Office Action Mailed Sep. 7, 2007 in Co-Pending U.S. Appl. No. 11/048,515, filed Jan. 31, 2005.
Final Office Action Mailed Mar. 8, 2007 in Co-Pending U.S. Appl. No. 11/048,515, filed Jan. 31, 2005.
Non-Final Office Action Mailed Sep. 7, 2006 in Co-Pending U.S. Appl. No. 11/048,515, filed Jan. 31, 2005.
Notice of Allowance Mailed Oct. 3, 2008 in Co-pending U.S. Appl. No. 11/203,357, filed Aug. 12, 2005.
Final Office Action Mailed Oct. 31, 2007 in Co-pending U.S. Appl. No. 11/203,357, filed Aug. 12, 2005.
Non-Final Office Action Mailed May 8, 2007 in Co-pending U.S. Appl. No. 11/203,357, filed Aug. 12, 2005.
Final Office Action Mailed Dec. 11, 2006 in Co-pending U.S. Appl. No. 11/203,357, filed Aug. 12, 2005.
Non-Final Office Action Mailed Jun. 14, 2006 in Co-pending U.S. Appl. No. 11/203,357, filed Aug. 12, 2005.
Final Office Action Mailed Jun. 18, 2007 in Co-pending U.S. Appl. No. 11/203,358, filed Aug. 12, 2005.
Non-Final Office Action Mailed Dec. 14, 2006 in Co-pending U.S. Appl. No. 11/203,358, filed Aug. 12, 2005.
Non-Final Office Action Mailed May 18, 2006 in Co-pending U.S. Appl. No. 11/203,358, filed Aug. 12, 2005.
Non-Final Office Action Mailed Apr. 1, 2010 in Co-pending U.S. Appl. No. 12/330,487, filed Dec. 8, 2008.
Notice of Allowance Mailed Apr. 6, 2010 in Co-pending U.S. Appl. No. 10/727,332, filed Dec. 2, 2003.
Advisory Action Mailed May 11, 2009 in Co-pending U.S. Appl. No. 10/727,332, filed Dec. 2, 2003.
Final Office Action Mailed Feb. 3, 2009 in Co-pending U.S. Appl. No. 10/727,332, filed Dec. 2, 2003.
Non-Final Office Action Mailed Jul. 9, 2008 in Co-pending U.S. Appl. No. 10/727,332, filed Dec. 2, 2003.
Final Office Action Mailed Nov. 26, 2007 in Co-pending U.S. Appl. No. 10/727,332, filed Dec. 2, 2003.
Non-Final Office Action Mailed May 9, 2007 in Co-pending U.S. Appl. No. 10/727,332, filed Dec. 2, 2003.
Final Office Action Mailed Nov. 9, 2006 in Co-pending U.S. Appl. No. 10/727,332, filed Dec. 2, 2003.
Non-Final Office Action Mailed Mar. 29, 2006 in Co-pending U.S. Appl. No. 10/727,332, filed Dec. 2, 2003.
Non-Final Office Action Mailed Mar. 13, 2009 in Co-pending U.S. Appl. No. 11/416,361, filed May 1, 2006.
Notice of Allowance Mailed Jul. 24, 2009 in Co-pending U.S. Appl. No. 11/586,446, filed Oct. 24, 2006.
Final Office Action Mailed Jan. 12, 2009 in Co-pending U.S. Appl. No. 11/586,446, filed Oct. 24, 2006.
Non-Final Office Action Mailed May 21, 2008 in Co-pending U.S. Appl. No. 11/586,446, filed Oct. 24, 2006.
Notice of Allowance Mailed Aug. 13, 2009 in Co-pending U.S. Appl. No. 11/601,323, filed Nov. 16, 2006.
Final Office Action Mailed Apr. 30, 2009 in Co-pending U.S. Appl. No. 11/601,323, filed Nov. 16, 2006.
Non-Final Office Action Mailed Sep. 12, 2008 in Co-pending U.S. Appl. No. 11/601,323, filed Nov. 16, 2006.
Final Office Action Mailed Apr. 10, 2009 in Co-pending U.S. Appl. No. 10/463,224, filed Jun. 16, 2003.
Non-Final Office Action Mailed Oct. 3, 2008 in Co-pending U.S. Appl. No. 10/463,224, filed Jun. 16, 2003.
Final Office Action Mailed Apr. 28, 2008 in Co-pending U.S. Appl. No. 10/463,224, filed Jun. 16, 2003.
Non-Final Office Action Mailed Apr. 18, 2007 in Co-pending U.S. Appl. No. 10/463,224, filed Jun. 16, 2003.
Japanese office action dated Oct. 26, 2010 for Japanese patent application 2006-538525 and English translation thereof, 9 pages.
English Abstract of publication No. 11-203127, Casio Computer Co Ltd., dated Nov. 17, 2010, 1 page.
English Abstract of publication No. 2001-195077, Sony Corp, dated Nov. 17, 2010, 1 page.
English Abstract of publication No. 10-207779, Victor Company of Japan, dated Nov. 17, 2010, 1 page.

English Abstract of publication No. 2003-6171, Nat Agricultural Res Org; Hirafuji Masayuki, dated Nov. 17, 2010, 1 page.
English Abstract of publication No. 2002-373080, Nokia Corp, dated Mar. 10, 2011, 1 page.
Japanese office action dated Oct. 26, 2010 for Japanese patent application 2006-538525 and English translation thereof, 9 pages
English Abstract of publication No. 11-203127, Casio Computer Co Ltd., dated Nov. 17, 2010, 1 page
English Abstract of publication No. 2001-195077, Sony Corp, dated Nov. 17, 2010, 1 page
English Abstract of publication No. 10-207779, Victor Company of Japan, dated Nov. 17, 2010, 1 page
English Abstract of publication No. 2003-6171, Nat Agricultural Res Org; Hirafuji Masayuki, dated Nov. 17, 2010, 1 page
English Abstract of publication No. 2002-373080, Nokia Corp, dated Mar. 10, 2011, 1 page
European office action dated Jan. 27, 2011 for European patent application 04 810 467.3-2212, 4 pages.
Search Report mailed Jan. 22, 2010 from European Serial No. 04812909.2 filed Dec. 2, 2004.
Office Action mailed Mar. 9, 2007 from U.S. Appl. No. 10/670,129, filed Sep. 23, 2003.
Office Action mailed Sep. 12, 2007 from U.S. Appl. No. 10/670,129, filed Sep. 23, 2003.
Office Action mailed Apr. 4, 2008 from U.S. Appl. No. 10/670,129, filed Sep. 23, 2003.
Office Action mailed Nov. 24, 2008 from U.S. Appl. No. 10/670,129, filed Sep. 23, 2003.
Search Report mailed Nov. 18, 2010 from International Serial No. PCT/US2010/041980 filed Jul. 14, 2010.
Office Action mailed Jun. 28, 2010 from U.S. Appl. No. 12/507,050, filed Jul. 21, 2009.
Office Action mailed Oct. 25, 2010 from U.S. Appl. No. 12/507,050, filed Jul. 21, 2009.
English Translation of DE 20014381, Rent A Brain GmbH, dated Aug. 16, 2011, 9 pages.
English Translation of JP2003-030157 publication, Sony Corporation, from Japanese Patent Office, 46 pages.
Search Report mailed Jul. 6, 2011 from European Serial No. 04709031.1 filed Feb. 6, 2004.
English Abstract of Japanese Publication No. 2001340646, Namco Ltd., dated Dec. 11, 2001, 1 page.
Office Action mailed Jan. 26, 2011 from U.S. Appl. No. 12/330,478, filed Dec. 8, 2008.
Office Action mailed May 31, 2011 from Japanese Serial No. 2006-538525 filed Nov. 5, 2004.
Office Action mailed Nov. 23, 2011 from U.S. Appl. No. 12/5070,050, filed Jul. 21, 2009.
Notice of Allowance mailed Nov. 8, 2011 from Japanese Serial No. 2006-538525 filed Nov. 5, 2004.

* cited by examiner

STATIC-OR-DYNAMIC AND LIMITED-OR-UNLIMITED CONTENT RIGHTS

BACKGROUND OF THE INVENTION

1. Field of the Invention

The invention relates to assignment or modification of rights to content, such as for example in a closed content distribution system, where those rights might be static or dynamic, and might be limited or permanent.

2. Related Art

Closed content distribution systems include end-to-end systems, including publishing servers, content distribution servers and playback devices, where the content that is playable on playback devices can be controlled through appropriate security techniques, and those security techniques make it relatively difficult for any unauthorized third party to distribute content that would be playable on the playback devices. In some closed content distribution systems, it might be possible to distribute unauthorized content, but the playback devices are restricted to only use that content subject to rights granted by authorized licenses. In such systems, security techniques might be applied to make it relatively difficult for any unauthorized third party to distribute licenses granting rights to use that content.

In known computing systems, rights to use current content (even when the content itself has already been delivered) are made substantially impossible to modify, with the effect that additions or upgrades to those rights that current content involve either replacing that current content with new content, or distributing licenses including rights to that new content, and possibly techniques for revoking outdated licenses. Distributing such new licenses might involve substantial resources, including communication with a license server or computation by that license server to determine whether a license with new rights should be granted. It would be advantageous to be able to dynamically change the interpretation of licenses already available to the play-back device, with the effect that those rights can be conditionally modified, even at a time well after the license was delivered to the user.

For one example, not intended to be limiting in any way, it would be advantageous to provide additional or upgraded game programs, or to provide new game programs, or to provide rights to use such additional or upgraded or new game programs, as an incentive to frequent or successful play of the current content. Other examples, also not intended to be limiting in any way, include cases where it is advantageous to provide additional or upgraded game programs, to provide new game programs, to provide rights to use such additional or upgraded or new game programs, or to provide other benefits, contingent on circumstances testable at the game device, or relatively local thereto, such as for example game state information when that state information is recorded by the current content. This would have the effect that rights to use current content could be effectively altered, modified, or otherwise added to, or even deleted or degraded in capability, without any code changes or media changes to that current content, and possibly without any intervention by a license server or similar device.

In known computing systems, if the current content maintains state information on externally-modifiable storage, that state information might be altered or appended to by another program or individual, with the effect that a player might be able to deceive the current content (such as for example a game program). While it is possible for the current content to encrypt or digitally sign that state information, it often occurs that the current content was not created with this capability in mind, with the effect that providing this capability would involve adding to or modifying that current content. As noted in the incorporated disclosure (as further described below), it is often not desirable to redesign or re-author the current content to provide this capability.

In some known systems, a game device does record a set of state information, such as for example a high score or a set of users who have achieved high scores, for the purpose of creating ranking lists and for the purpose of providing an initiative to the users to achieve rankings. In some such systems, the game device might allow the user to continue play for a duration of time, or might allow the user access to selected new portions of the game, in response to whether that user has achieved a specific objective. However, in such systems, there is no substantial provision for the game device to dynamically modify rights to content (except for such extensions) or to dynamically provide rights to additional or upgraded or new content, across multiple sessions or using saved state information.

Accordingly, it would be advantageous to provide techniques with the effect that state information can be maintained on externally modifiable storage without the risk of a player being able to deceive the current content, and with the effect that rights can be dynamically altered to provide new or modified rights, in response to saved state information. In a closed-content distribution system, it would further be advantageous to provide techniques with the effect that a secondary program can use that game state information. That secondary program might be located logically relatively local to a secure processor used with the closed content distribution system, or logically relatively distant from the secure processor. In a closed-content distribution system, it would further be advantageous to provide techniques with the effect that licenses can be dynamically reinterpreted (whether to add, modify, or remove rights) in response to that saved game state information.

Even in systems where rights might be static or dynamic, there is further advantage in being able to restrict the nature of the rights granted by the license. For one example, not intended to be limited in any way, at least one particular set of cases exists where it would be advantageous to make the rights granted by the license be limited in time, such as for example (1) by the amount of time the user is allowed to play the game, (2) by the number of times the user is allowed to play the game, or (3) by the duration of time during which the user is allowed to play the game. While these specific cases might be regarded as a special case of dynamic rights (that is, where the rights are dynamic in the sense that they are conditional on a measure of time), there is particular advantage to providing such limited rights, such as for example for testing, "free trials," and rentals of application programs or games.

Accordingly, it would be advantageous to provide a technique involving either static or dynamic assignment of rights to content, and either limited or unlimited rights to content, such as for example in a closed distribution system.

SUMMARY OF THE INVENTION

The invention provides methods and systems capable of assignment or modification of rights to content, such as for example in a closed content distribution system, where those rights might be static or dynamic, and might be limited or permanent. For a first example, not intended to be limiting in any way, the invention provides methods and systems capable of either static interpretation or dynamic reinterpretation or updating of licenses to provide new or modified rights to content, and either static assignment or dynamic assignment of rights to content, such as for example in a closed distribution system. For a second example, not intended to be limiting in any way, the invention provides methods and systems capable of either limited assignment or unlimited assignment of rights to content, such as for example limited rights that are governed by time limitations or otherwise limited for a marketing purpose, and such as for example unlimited rights, such as for example might be traditionally conferred by purchase of permanent license for content.

In a first aspect, the invention provides methods and systems capable of noting state information generated by an item of current content, and capable of providing new rights to content or new content (with the effect of adding to or updating the current content) in response thereto. In one embodiment, electronic or physical media might dynamically send new rights to content or new content to the owner of the current content, or that new content might be pre-loaded and available at the recipient device in response to new rights to that content. In response to the state information generated by an item of current content, the license server might dynamically send a license to the new content, either in response to a selected actual value of that state information or in response to a selected changed value therein.

In a second aspect, the invention provides methods and systems including conditional or dynamic licenses to new content. In one embodiment, a conditional license to new content includes a set of rights to content, those rights being associated with a class of possible sets of state information generated by an item of current content. For a first example, not intended to be limiting in any way, the user might obtain a set of current content C, a set of new content N, and a conditional license L, where the conditional license L provides:

License for C
IF (always) THEN (rights to use C)
License for N
IF (on state information including S) THEN (rights to use N)

In this example, the "state information including S" is emitted or other-11 wise generated by C, and the "rights to use N" are, but need not be, in addition to the already extant rights to use C.

Similarly, for a second example, not intended to be limiting in any way, the user might obtain a set of current content C, a set of new content N, and a dynamic license L, where the dynamic license L provides:

Limited License for C
IF (time $t<t_0$) THEN (rights to use C)
Conditional License for N
IF ((on state information including S) or (time $t>t_0$)) THEN (rights to use N)

Similarly, in this example, the "state information including S" is emitted or otherwise generated by C, and the "rights to use N" are, but need not be, instead of the already rights to use C (those rights to use C expire at $t=t_0$).

In these aspects of the invention, a "license" or other content rights, associated with selected content, might be represented by a data structure maintained in storage. The storage might be secure storage (such as for example included with a secure hardware device, such as a chip) or might be otherwise non-secure storage (such as for example RAM or disk storage), but digitally signed or encrypted by a security system, with the effect that the license or other content rights cannot be easily modified or read without approval by the security system. The content rights might be dynamically updated themselves, with the approval of the security system, or might represent a dynamic determination of content rights, as described above, such as in an "IF-THEN" format, where the "IF" part represents a conditional trigger for additional or modified rights, and where the "THEN" part represents the additional or modified rights. This has the effect that content rights are effectively a function of the state of a selected content element, such as for example a game score, a time played, or other value. The security system prevents any changes to the state of the selected content element, with the effect that cheating on the original game is prevented.

In a third aspect, the invention provides methods and systems including limited assignment of rights to content, such as for example limited rights that are governed by time limitations or otherwise limited for a marketing purpose. For some examples, the rights might be limited by the amount of time the user is allowed to play the game, as measured by actual time of execution of the game by the secure processor, as measured by the number of times the user is starts the game as recorded by the secure processor, or by the duration of time during which the user is allowed to play the game as measured by the secure processor. These particular limited sets of rights have the advantage of being well suited to games testing, "free trials," and rentals of application programs or games. The invention also provides methods and systems including unlimited assignment of rights to content, such as for example might be traditionally conferred by purchase of underlying media including unencrypted content.

In a first embodiment, a dynamic license or a set of dynamic content rights might be represented within a data structure including a set of instructions (such as for example a set of machine code instructions, a pointer to a set of machine code instructions, a set of scripting language instructions, a pointer to a set of scripting language instructions, or other representation of the conditional "IF-THEN" nature of the dynamic rights). When the rights are to be reviewed to determine if the user has dynamic rights, the instructions are parsed (if necessary) and performed (either by execution, interpretation, emulation, or otherwise) by a secure processor. Any other techniques that are responsive to the state of selected content, and provide a descriptor of a set of enforceable rights, would be within the scope and spirit of the invention. After reading this application, those of ordinary skill in the art would recognize that these other techniques would be workable, and would not require either undue experimentation or further invention.

In a second embodiment, a dynamic license or a set of dynamic content rights might be represented by allowing an issuer of that dynamic license to read the state of the selected content, and to dynamically issue a license in response to that state. This has the effect that the issuer of the dynamic license would be allowed to read that state, and would be allowed to determine in real time whether or not to issue an appropriate license. One advantage of this second embodiment is that the playback device need not implement any such dynamic assignment rules in advance, and that the issuer of the dynamic license would be able to change its dynamic rules for issuing a license at an appropriate time. For example the issuer of the dynamic license need not revoke the earlier dynamic license or issue a new dynamic license, and need not tell the playback device what the issuers' intended rules are for issuing the dynamic license.

In one embodiment, a dynamic license or a set of dynamic content rights might be represented by allowing a set of security software to dynamically alter interpretation of a license, or the rights granted therein, under control and supervision of a secure processor.

For a first example, not intended to be limiting in any way, a first content element C1 might emit a state S, with the effect of altering or modifying rights to the content C2 such that its conditions to launch are met and it can be executed.

For a second example, not intended to be limiting in any way, a first content element C1 might provide an incentive for a user to execute a second content element C2, by providing that second content element C2 with the ability to alter or modify the state of the content C1 (such as for example by adding bonus points to the score for C1, or otherwise marking as achieved a goal within the context of C1). This second example is not necessarily preferred.

After reading this application, those skilled in the art would recognize that the techniques described herein provide an enabling technology, with the effect that heretofore advantageous features can be provided that heretofore were substantially infeasible.

For example, not intended to be limiting in any way, the techniques described herein provide that contests or games might be conducted, with the effect that one or more winners (as determined, for example, in response to relative scores or relative times taken) of the contest or game would receive an appropriate prize, such as for example: a bonus game, a set of bonus "levels" or other modules for a game, a cash prize, a credit toward purchase of a new or upgraded game, and the like. In various embodiments, the contest or game might include one winner, or more than one winner, or one or more winners of more than one class of winners, and the like. In various embodiments, the contest or game might include a team of players whose joint score is responsive to the individual scores of the team members, such as a sum or median of those scores or a maximum one or more of those scores. In various embodiments, the original game, the bonus game, or both, might include provisions for individual play, for joint play, or for cooperative play. For example, not intended to be limiting in any way, an entity not associated with the original author or distributor of the game might provide a contest (either with or without entry requirements), in which superior play of the original game is rewarded with an update to that game, or with an update to rights to use that game. The update might or might not be created by the original author or distributor of the game, the entity conducting the contest, or otherwise. (However, after reading this application, those skilled in the art would recognize that the nature of the closed content distribution system would generally prevent external entities from providing authentic updates to content elements.)

For example, not intended to be limiting in any way, the techniques described herein provide that games already available to the user in the closed system might appear to be upgraded, such as by alteration or emendation, without any particular requirement of rewriting code for the original game, or for having access to that original code. In various embodiments, the game might be upgraded by providing a new program that checks the state of the old game, and makes changes in the behavior of the old game, either by directly interacting with the user, or by altering the state information of the old game (with the intercession of the security system), or some combination or conjunction thereof.

For example, not intended to be limiting in any way, the techniques described herein provide that educational software might be altered or emended to provide for an appropriate prize or reward for successful learning, such as for example: a right to play a game program (either generically or limited to a selected period of time), a right to play bonus "levels" or other modules for a game, a cash prize, a credit toward purchase of a new or upgraded game, a next or another educational program "level" or other module for the educational program, a credit toward purchase of a new educational program, and the like.

For example, not intended to be limiting in any way, the techniques described herein provide that educational software might have the ability to, in response to completion of a first educational program or in response to achievement of a selected level of achievement (such as a successful grade on a test), provide access to a second educational program or test material (or to a next level of the same educational program or test material).

For example, not intended to be limiting in any way, the techniques described herein provide for security checks before accessing critical or otherwise sensitive data, such as for example confidential business information, confidential personal information, confidential financial information, program code, trade secrets, and the like.

For example, not intended to be limiting in any way, the techniques described herein provide for a chain (whether sequential or organized as a directed graph, with either conditional or unconditional transfers at each edge of that directed graph) events for the system to watch for, and in response thereto, take action on.

For example, reaching a selected state in a first game program might provide the user with the right to play a second game, reaching a selected state in the second game program might provide the user with the right to play a third game, and the like. After reading this application, those skilled in the art would recognize that such a chain might form a complex logical structure, such as a tree structure, a directed acyclic graph, or a directed graph including at least one closed loop.

For example, not intended to be limiting in any way, the techniques described herein provide for limited assignment of rights to content, such as for example limited rights that are governed by time limitations or otherwise limited for a marketing purpose. For some examples, the rights might be limited by the amount of time the user is allowed to play the game, by the number of times the user is allowed to play the game, or by the duration of time during which the user is allowed to play the game. These particular limited sets of rights have the advantage of being well suited to games testing, "free trials," and rentals of application programs or games.

INCORPORATED DISCLOSURES

Figure 1:
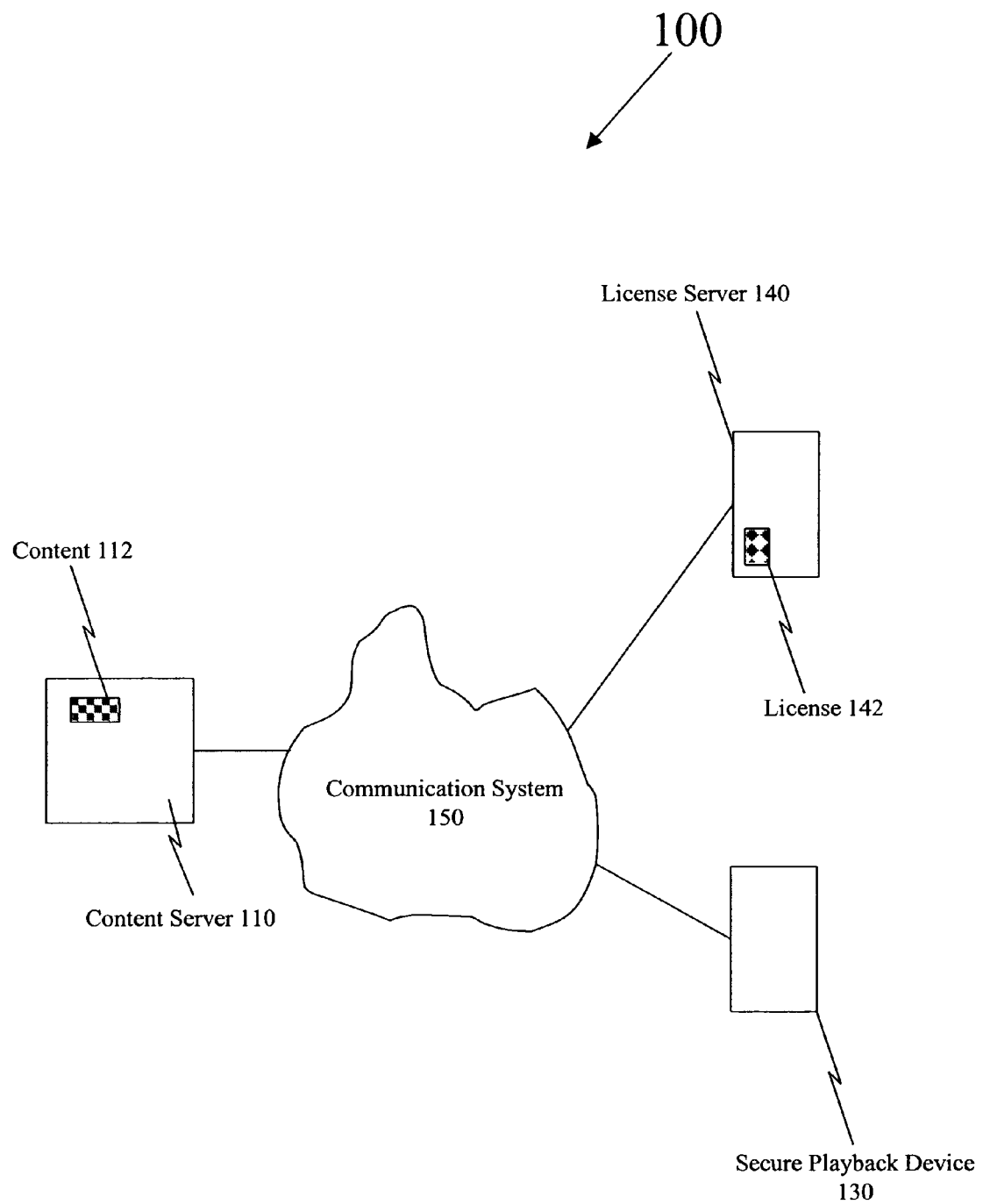
FIG. 1 shows a block diagram of a system including dynamic assignment of rights to content in a closed distribution system.

This application claims priority of the following documents, each of which is hereby incorporated by reference as if fully set forth herein.

U.S. patent application Ser. No. 10/360,827, filed Feb. 7, 2003, titled "Secure and Backward-Compatible Processor and Secure Software Execution Thereon".

These documents are hereby incorporated by reference as if fully set forth herein, and are sometimes referred to herein as the "incorporated disclosure".

Inventions described herein can be used in combination or conjunction with technology described in the incorporated disclosure.

DETAILED DESCRIPTION OF THE PREFERRED EMBODIMENT

In the description herein, a preferred embodiment of the invention is described, including preferred process steps and data structures. Those skilled in the art would realize, after perusal of this application, that embodiments of the invention might be implemented using a variety of other techniques not specifically described, without undue experimentation or further invention, and that such other techniques would be within the scope and spirit of the invention.

Lexicography

The following terms relate or refer to aspects of the invention or its embodiments. The general meaning of each of these terms is intended to be illustrative and in no way limiting.

The phrases "content server" or "content distribution server" generally describe, in the distribution system, any device capable of delivering content (either directly or indirectly), to a secure processor or secure playback device, using any form of transport technique. As described below, the content distribution server needs only a single copy of each content element, and might deliver multiple individualized copies of that content element in response to distinct users or in response to distinct requests. The concept of a content server is broad, and includes not only a server having content stored thereon, but also devices by which content might be dynamically created, such as a television camera, video camera, webcam, any reasonable generalization thereof, and the like. The content server may include a secure device capable of generating a secure hash and securely signing any information distributed from the server.

The phrase "license server" generally describes, in the distribution system, any device capable of delivering licenses for content. As described below, the license server includes in the license it emits at least (1) a decryption key for the content, that decryption key being encrypted by a private key for the specific playback device, and (2) a digital signature or secure hash value that can be used to verify authenticity of the license, and optionally, (3) a digital signature or secure hash value that can be used to verify authenticity of the content. In one embodiment the license server includes an online transaction server capable of requesting an identity of the device requesting the license and capable of creating, in response, a cryptographically signed data structure containing information specifying a device identity, a content identity and a set of content decryption keys.

The phrases "secure processor" and "secure playback device" generally describe the devices on which the content will be executed or interpreted (for code or instructions) or by which the content will be displayed or presented (for media content). As described below, the secure processor is relatively secure against tampering, and includes at least a UID (unique identifier) or a known encryption key (such as for example a private key in a public-key cryptosystem), with the effect that other elements of the system are capable of communicating privately and securely with the secure processor. The concept of a secure processor is broad, and includes any general purpose or special purpose computing device for which there is at least some secure memory, secured against inspection or intrusion from outside the secure processor, and for which there is at least some executive control capable of preventing application software from disclosing the contents of that secure memory. In one embodiment, the secure processor has built in security software that cannot readily be circumvented, or other techniques to securely bootstrap the loading of such security software from insecure devices, such as for example external mass storage. In such embodiments, the secure playback device can include a playback device capable of presenting information, under control of the secure processor, to a user, such as for example a game-player or student.

The term "content" or the phrase "content element" generally describe an application program (such as for example a game program) or a set of media content (such as for example an animation clip or a video clip) to be executed or interpreted (for code or instructions) or to be displayed or presented (for media content). As described below, the content might include application software, audio/video presentations, databases, educational programs, games or educational games, multimedia content, teaching materials, reasonable combinations or generations thereof, and the like.

The phrases "content state" or "state of the content element" generally describe a set of information generated in response to a state of the content, such as for example related to the state of progress through a game, such as for example a data structure including values the content saves in persistent storage, either for deliberate publication to possible readers thereof, or to record for itself its own state for later recovery if need be. As described below, the content state might represent progress of a player in a game, such as a score value or a time-taken value. The secure processor might (1) encrypt the content state, with the effect that it can only be read by authorized readers, (2) digitally sign the content state, with the effect that it cannot be altered without detection by the content element, or (3) both, with the effect that the content state might be maintained on persistent storage outside the secure processor.

The term "license" generally describes information sufficient for the secure playback device use the content subject to the rights granted by the license, and possibly to authenticate the content. In one embodiment, each license includes a data structure associated with one or more content elements, and including, in one embodiment, (1) an encrypted key for that content, with the effect that the secure processor can access the content if it has access to the license, and (2) a digital signature or secure hash value, with the effect that the license cannot be easily altered and remain effective. As described below, the license also includes a description of those rights the license grants to the licensee with regard to the content. In one embodiment, licenses are individually tailored to each individual authorized recipient or user, and to each individual secure playback device for which that recipient or user is authorized, although in the context of the invention there is no such particular requirement.

The term "rights" and the phrases "content rights" or "rights to the content" generally describe what actions the secure processor is allowed to take with regard to the content. For some examples, not intended to be limiting in any way, the rights might include a number of times the secure processor is allowed to execute the content, an amount of total running time the secure processor is allowed to execute the content, an amount of wall-clock time the secure processor is allowed to execute the content, and the like. As described below, the secure processor prevents any use of the content outside those specified by the content rights. As described below, rights might be "static" or "dynamic," and might be "limited" or "unlimited."

The terms "static" and "dynamic," in the context of rights granted (by a license) to content, generally describe whether the rights are unconditional or static (in the sense that they do not change in response to the state of an application program or state of a game) or whether the rights are conditional or dynamic (in the sense that they might be altered, added to, or subtracted from, in response to the state of an application program or state of a game).

The terms "limited" and "unlimited," in the context of rights granted (by a license) to content, generally describe whether the rights are limited in one or more selected ways, such as for example time-limited or play-limited, or whether the rights are substantially unlimited, such as for example in the case of a traditional purchase of a permanent license for a game for that specific user or for that specific playback device.

The scope and spirit of the invention is not limited to any of these definitions, or to specific examples mentioned therein, but is intended to include the most general concepts embodied by these and other terms.

System Elements

FIG. 1 shows a block diagram of a system including dynamic assignment of rights to content in a closed distribution system.

A system 100 includes a content server 110, a secure playback device 130, a license server 140, and a communication system 150.

The content server 110 includes any device or system capable of delivering content 112 to the secure playback device 130, directly or indirectly. In one embodiment, the content server 110 might include a server device capable of receiving requests for content 112 from the secure playback device 130, and responding to those requests by sending content 112 using the communication system 150. However, in the context of the invention, there is no particular requirement that the content server 110 receives explicit requests for content 112 from the secure playback device 130. For example, not intended to be limiting in any way, the content server 110 might deliver the content package 111 including content 112 to the secure playback device 130, in accordance with a request for a subscription to that content 112, a request from a device other than the secure playback device 130, an original request from the secure playback device 130 or another device for the content 112 and any updates thereto, reasonable generalizations thereof, and the like.

In the context of the invention, it is possible that the secure playback device 130 can have access to the content 112 without being able to use that content 112, such as for example if a license 142 (as further described below) is required to authenticate or decrypt the content 112. In one embodiment, the secure playback device 130 might receive many elements of content 112, but not receive licenses 142 until a user presents proof of purchase of such a license 142. In the latter event, the secure playback device 130 would obtain a license 142 from the license server 140, either directly in response to the proof of purchase, or indirectly by the user entering information from the license 142, obtained from the license server in response to the proof of purchase.

The license server 140 includes any device or system capable of delivering a license 142 to the secure playback device 130, directly or indirectly. In one embodiment, the license server 140 might include a device similar to the content server 110. However, in the context of the invention, there is no particular requirement that content server 110 and the license server 140 operate in the same or a similar manner. For example, not intended to be limiting in any way, the content server 110 might deliver the content 112 in a first manner, while the license server 140 delivers the license 142 in a second manner.

After reading this application, those skilled in the art will recognize that in the context of the invention, there is no particular requirement that the content 112 or the license 142 be embodied in any particular format. For a first example, not intended to be limiting in any way, any one of these elements might be represented by one or more messages in an underlying communication transport protocol. For a second example, not intended to be limiting in any way, any one of these elements might be represented by inclusion or incorporation into a set of messages for collectively transporting multiple such elements. Those skilled in the art would recognize, after perusal of this application, that in the context of the invention, there is no particular requirement that the transport protocol need be either of these specific protocols, but might include other and further protocols, combinations of transport techniques, or significant variants thereof.

The communication system 150 includes any device or system, or technique, capable of delivering information (such as for example the content package 111) among the elements of the system 100. In one embodiment, the communication system 150 includes a communication network, such as for example an Internet, intranet, extra-net, VPN, LAN, WAN, enterprise network, private or public switched network, or broadcasting system, capable of electronic communication of the content package 111 including the content 112. However, in the context of the invention, there is no particular requirement that the communication system 150 operates electronically, either in 19 whole or in part. For example, not intended to be limiting in any way, the communication system 150 might include (at least in part) transport of physical media on which the content package 111 including the content 112 is encoded, such as for example a CD-ROM, rewritable CD, DVD, floppy disk, detachable hard disk drive, magnetic tape, paper tape, bar-coded package, or any other media capable of being sensed and interpreted by the secure playback device 130.

The secure playback device 130 includes a computing device capable of performing the tasks described herein, including receiving the content 112 directly or indirectly from the content server 110, and receiving the license 142 directly or indirectly from the license server 140. In one embodiment, the secure playback device 130 includes a secure processor including a secure state and a monitored state as described in the incorporated disclosure, optionally augmented using at least one auxiliary device 131 and external storage 132, and with an application program such as a game program running in the monitored state. In one embodiment, the external storage 132 might include RAM (random access memory), mass storage devices (such as for example magnetic or optical disk drives), a removable storage device (such as for example a flash memory or PC card including a disk drive), or some combination thereof.

In one embodiment, the application program (such as a game program running in the monitored state) has a process operating on the secure processor, that process having access to the state of the game, and capable of performing actions to alter the state of the game. In such embodiments, the state of the game can be maintained in the external storage 132. The state of the game might then be copied for use by a second device, or sent to that second device, either physically such as by moving the media on which the external storage 132 is embodied, or electronically such as by communication over a network.

As described above, in a first embodiment, a dynamic license or a set of dynamic content rights might be represented within a data structure. The data structure might be maintained within the secure playback device 130 or in the external storage 132, with the effect that a secure processor associated with the secure playback device 130 is capable of parsing and enforcing those dynamic content rights.

As described above, in a second embodiment, a dynamic license or a set of dynamic content rights might be represented by allowing an issuer of that dynamic license to read the state of the selected content, and to dynamically alter or issue a license 142 in response to that state. The issuer of the dynamic license would be allowed to obtain the state of the game from the external storage 132, and to dynamically alter or issue a license 142 for an element of content 112.

As described above, in a third embodiment, an element of content 112, under control and supervision of a secure processor associated with the secure playback device 130, can modify the state of the game by writing to the external storage 132. In such embodiments, either in combination with the first embodiment or the second embodiment described above, the element of content 112 can have the effect of providing a dynamic license or a set of dynamic content rights.

For a first example, not intended to be limiting in any way, a first content element C1 might emit a state S with the effect of altering or modifying rights to the content C2 such that its conditions for launch are exuction are met as a result of state S.

For a second example, not intended to be limiting in any way, a first content element C1 might provide an incentive for a user to execute a second content element C2, by providing that second content element C2 with the ability to alter or modify the state of the content C1 (such as for example by adding bonus points to the score for C1, or otherwise marking as achieved a goal within the context of C1). This second example is not necessarily preferred.

In each of these described embodiments, this has the effect that a dynamic license or a set of dynamic content rights can provide the user with rights to a second element of content 112, in response to the state of the game for a first element of content 112. After reading this application, those skilled in the art would recognize that this is similar to a directed graph, where nodes of the direct graph represent sets of content rights and edges of the directed graph represent dynamic changes to those sets of content rights.

The state of the game might be in response to a result from an individual user, such as for example a raw score, a timed score, or some combination thereof. The state of the game might also or alternatively be in response to an aggregate result, such as for example a total, a maximum or minimum of some calculated value, or some combination thereof. The aggregate might be applied to a set of results from an individual user, or to a set of results from more than one such user.

The dynamic license or set of dynamic content rights (that is, in response to the state of the game) might include one or more of the following:

gaining/losing rights to other games or to extensions of the same game;

gaining/losing some other valuable thing, such as real money, game money, or entrance into a contest or club relating to the game;

reporting the state of the game to a remote device, either in response to an individual user or in response to an aggregate of a set of users, such as for example to determine a high score, a contest winner, or possible inappropriate activity (such as for example cheating at the game);

conducting a commercial transaction with a user, such as for example selling the user another element of content 112 (such as for example a game, or such as for example an extension of the same game).

The dynamic license or set of dynamic content rights (that is, in response to the state of the game) might be completely detached from any aspect of the game itself. The game only has control of what state it reports, not what is done with that information. This has the effect that the dynamic license or set of dynamic content rights might include one or more of the following:

New content 112 N might obtain rights that new content 112 N otherwise did not have, in response to the state of original content 112 C, such as for example rights for the new content 112 N to be initiated, launched, or started.

After reading this application, those skilled in the art will recognize that in the context of the invention, there is no particular requirement that the content server 110 and the license server 140 actually be separate devices. For one example, not intended to be limiting in any way, the content server 110 and the license server 140 might be co-hosted at the same device, which device would serve both the function of the content server 110 and the function of the license server 140. After reading this application, those skilled in the art will recognize that other and further variants of these ideas are within the scope and spirit of the invention, and would be workable without undue experimentation or further invention.

License Elements (Static or Dynamic)

Each license 142 includes a data structure that might represent a static or "unconditional" license, that is, a license that does not depend on any state of the content, or a dynamic or "conditional" license, that is, a license that might be responsive to the state of the content, with the effect of providing distinct rights in response to distinct states. In one embodiment, a conditional license includes a data structure including an "IF-THEN" construct including (1) an "IF" condition which when satisfied releases the rights described in the "THEN" portion, and (2) a "THEN" portion, which describes a set of rights conditional on the "IF" portion. This has the effect that the rights described in the "THEN" portion are conditional on whether the triggering conditions described in the "IF" portion have occurred.

A first choice of alternative embodiments includes whether the "IF" condition is to be evaluated substantially locally (that is, at the secure processor 130) or whether the "IF" condition is to be evaluated substantially remotely (that is, at one or more license servers 140). Although each possibility is described separately herein, after reading this application those skilled in the art would recognize that combinations of these alternatives would be workable, are within the scope and spirit of the invention, and would not require undue experimentation or further invention.

In cases where the "IF" condition is evaluated substantially locally, the "IF" condition might include a description of one or more content elements to which the conditional license is responsive. Similarly, in such cases, the "IF" condition might include a set of instructions capable of being executed (such as for example machine code) or interpreted (such as for example a scripting language) by the secure processor 130, or another processor with access to the state of the content, a result of those instructions providing a yes/no answer to whether the "IF" condition is satisfied. In one embodiment, an "IF" condition might be a function of a saved state of a game, during or after execution, digitally signed using a cryptographically-strong cipher.

After reading this application, those skilled in the art would recognize that such "IF" and "THEN" conditions might themselves be global in nature, or might have their context restricted in response to specific content elements, to specific content states, to specific users, or otherwise in response to selected tests performable at times when those "IF" and "THEN" conditions are evaluated. Moreover, those skilled in the art would recognize that such "IF" and "THEN" conditions might have specific date, location, or time restrictions, or other restrictions such as the nature of the hardware or software (such as a software version number) of the secure processor or the playback device. Those skilled in the art would recognize that such possibilities are within the scope and spirit of the invention, and could readily be implemented with reference to this application, without undue experimentation or further invention.

In cases where the "IF" condition is evaluated substantially remotely, the "IF" condition might include a description of one or more license servers 140 to which the conditional license is responsive. Similarly, in this second embodiment, the "IF" condition might include either a command or request or program entry point at a selected license server 140, to be called upon or invoked or requested, a result of which call or invocation or request providing a yes/no answer to whether the "IF" condition is satisfied.

A second choice of alternatives includes whether the "THEN" portion is to be maintained substantially locally (that is, stored at the secure processor 130) or whether the "THEN" portion is to be maintained substantially remotely (that is, generated by the license server 140). Although each possibility is described separately herein, after reading this application those skilled in the art would recognize that combinations of these alternatives would be workable, are within the scope and spirit of the invention, and would not require undue experimentation or further invention.

In cases where the "THEN" portion is maintained substantially locally, the "THEN" condition might include a description of a set of rights available to the user for the content whose license is being evaluated, in response to the "IF" condition is or was satisfied.

In cases where the "THEN" portion is maintained substantially remotely, the "THEN" portion might include a description of one or more license servers 140 at which the "THEN" portion was or will be generated. Similarly, in this second embodiment, the "THEN" portion might include either a command or request or program entry point at a selected license server 140, to be called upon or invoked or requested, a result of which call or invocation or request providing a description of a set of rights available to the user in response to whether the "IF" condition is or was satisfied.

After reading this application, those skilled in the art would recognize that conditional licenses might be coupled in series, with the effect that the "THEN" portion of a the "IF-THEN" data structure of a first conditional license might itself include a second conditional license, that is, a second "IF-THEN" data structure, with the effect that the second conditional license includes rights that are conditional upon the first conditional license, and upon further conditions.

Similarly, after reading this application, those skilled in the art would recognize that conditional licenses might be coupled in parallel, with the effect that a license might include both an unconditional part (for which the user obtains those rights unconditionally) and a conditional part (for which the user obtains the associated rights only upon satisfaction of the stated condition).

This has the effect that, in one embodiment, new content 112 for which the user does not have a license 142 might be present at the secure processor 130, either by pre-arrangement or by dynamic delivery in response to the conditional license 142. In either such case, when that new content 112 is available at the secure processor 130, the secure processor 130 prevents access to the new content 112 until there is an effective set of rights available from a license 142. When a conditional license 142 is triggered, with the effect that the rights it describes (or obtains from a license server 140) allow access to the new content 112, the secure processor 130 then allows access to that new content 112.

The license 142 or the rights described by that license 142 might be represented by a data structure maintained in storage. The storage might be secure storage (such as for example included with the secure processor 130, such as a chip) or might be otherwise non-secure storage (such as for example RAM or disk storage), but digitally signed or encrypted by the secure processor 130 (or digitally signed or encrypted by the license server 140), with the effect that the license 142 or other content rights cannot be easily modified or read without approval by the secure processor 130. The rights conferred by the license 142 might be dynamically updated themselves, with the approval of the secure processor 130, or might represent a dynamic determination of rights by a license server 140, as described above.

In one embodiment, each license 142 maintained at the license server 140 includes is specific to an individual set of content 112 and an individual secure playback device 130, and is maintained in a digitally signed form, with the effect that the license 142 cannot easily be modified. In alternative embodiments, each license 142 might be specific to a designated set of secure playback devices 130, such as for example a set of secure playback devices 130 belonging to a common owner, located at a common place, or having a common configuration type. Each license 142 includes information sufficient to decrypt the content 112 and verify that that content 112 is authentic, and possibly other data regarding how the content is protected or how the secure playback device 130 is allowed to use the content 112. In one embodiment, each license 142 includes a recipient UID (unique identifier) for the secure playback device 130 to which it is directed, the content key 113 CK, one or more secure hash values SH, using which the secure playback device 130 can verify the authenticity of the content 112, and a crypto-graphically-secure signature identifying the source of the license 142.

This has the effect that rights to content 112 can be altered in response to a function of the state of a selected content element 112, such as for example a game score, a time played, or other value, such as another characteristic of player success in a game. The secure processor 130 prevents any changes to the state of the selected content element 112, with the effect that cheating on the original game to obtain rights for new content 112 is prevented. In cases where the content state is responsive to a characteristic of player success in the game, the conditional rights have the effect of being a bonus or reward available to those players who reach that designated level of player success.

License Elements (Limited or Unlimited)

Each license 142 also might represent a "limited" license, that is, a license for which rights are limited in one or more selected ways, such as for example time-limited or play-limited, or an "unlimited" license, that is, a license for which rights are substantially unlimited, such as for example permanent rights to use a game, as might occur in the case of a traditional purchase of physical media including embedded content with permanent rights.

Limited licenses are limitations on rights as a function of actual time of execution, or number of launches of the game. These rights are securely enforced by the secure processor and are a function of that particular content. Thus, for some examples, a limited license might be limited by time (either time duration of play, time duration of when the content is available to the user, or otherwise), or might be limited by number of plays (either number of times the game is started, or otherwise). In these examples, operation of the game has an effect on whether the condition is satisfied for the license to allow the user rights, primarily the operation of the game is an effect that would be similar across nearly all games, such as time played or number of times started.

In further examples, a limited license might provide a parameter which limits or prevents execution of the game, or a portion thereof, such as for example a parental control parameter. In such an example, the game might read the parental control parameter and present alternative game-play scenarios to the user (such as refusing to allow access to "adult" content when the parental control parameter so specifies).

License Elements (Business Models)

The combination of static-or-dynamic and limited-or-unlimited allows the invention to provide methods and systems in which selected business models of behavior are followed. Some examples, not intended to be limiting in any way, are:

- A combination of static and unlimited license parameters allows the invention to provide a rights-management scheme in which a license 142 to content 112 is purchased to obtain access to that content 112, and when that license 142 is purchased, the user has unlimited rights to use that content 112.
- A combination of static and limited license parameters allows the invention to provide a rights-management scheme in which a license 142 to content 112 is time-limited (such as for example a "free trial" for that content 112, or when purchased, such as for example rental of that content 112 for a limited duration of time) or play-limited (also such as for example a "free trial" for that content 112, or when purchased, such as for example rental of that content 112 for a limited-number of executions).
- A combination of dynamic and unlimited license parameters allows the invention to provide a rights-management scheme in which a license 142 to content 112 is dynamically enabled in response to a state of another game (such as for example a "bonus game" when the user reaches a selected achievement level in another game), and other concepts described herein.
- A combination of dynamic and limited license parameters allows the invention to provide a rights-management scheme in which a license 142 to content 112 dynamically enables, in response to a state of the game, dynamically enables limited rights to another game, for example, a bonus trial, or dynamically limits execution of another game, for example, as in parental control, or dynamically limits execution of a game in which a license 142 to content 112 is limited to selected times of day.

Method of Operation

Figure 2A:
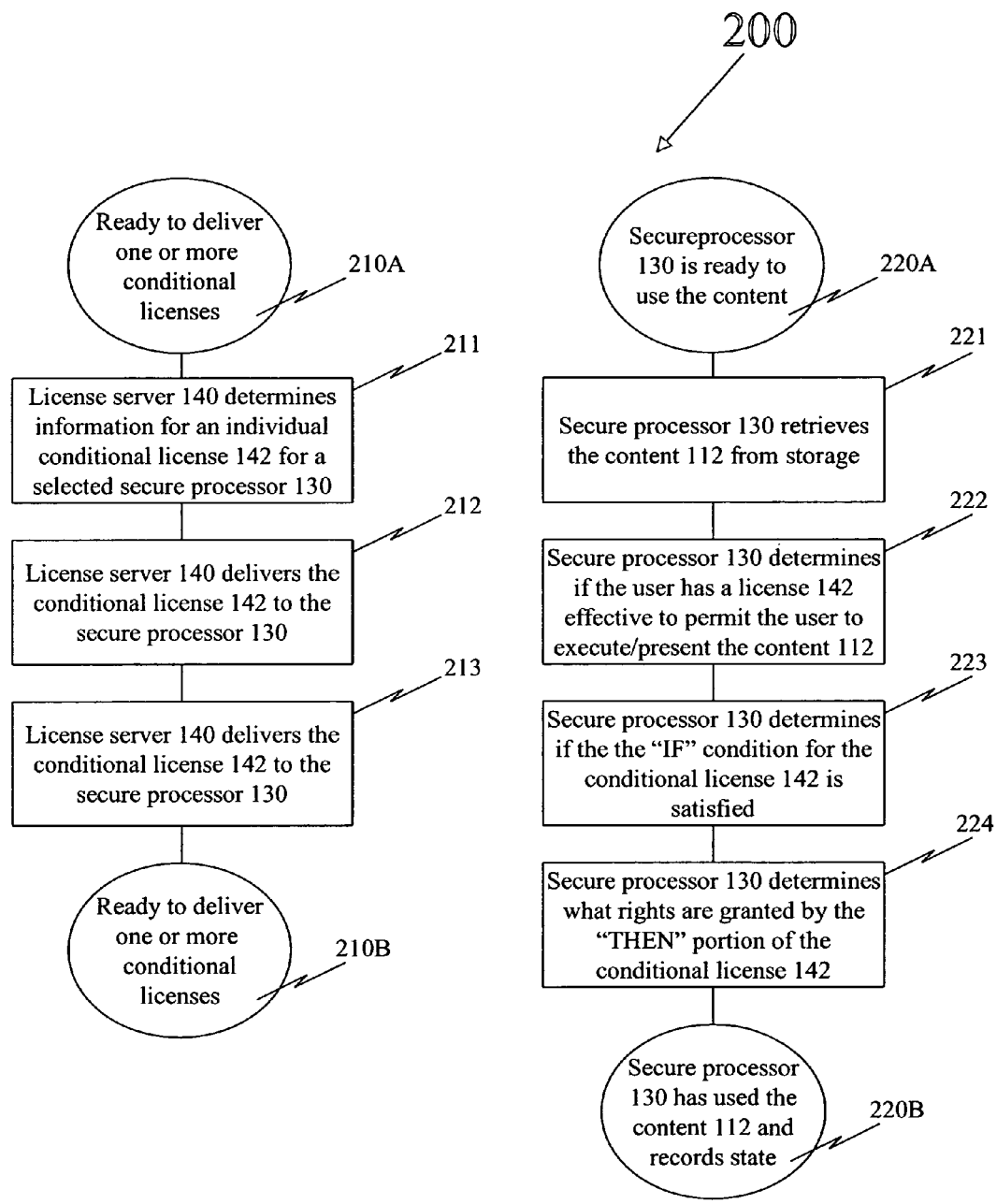
FIGS. 2a and 2b show a process flow diagram of a method of operating the system including dynamic assignment of rights to content in a closed distribution system.
Figure 2B:
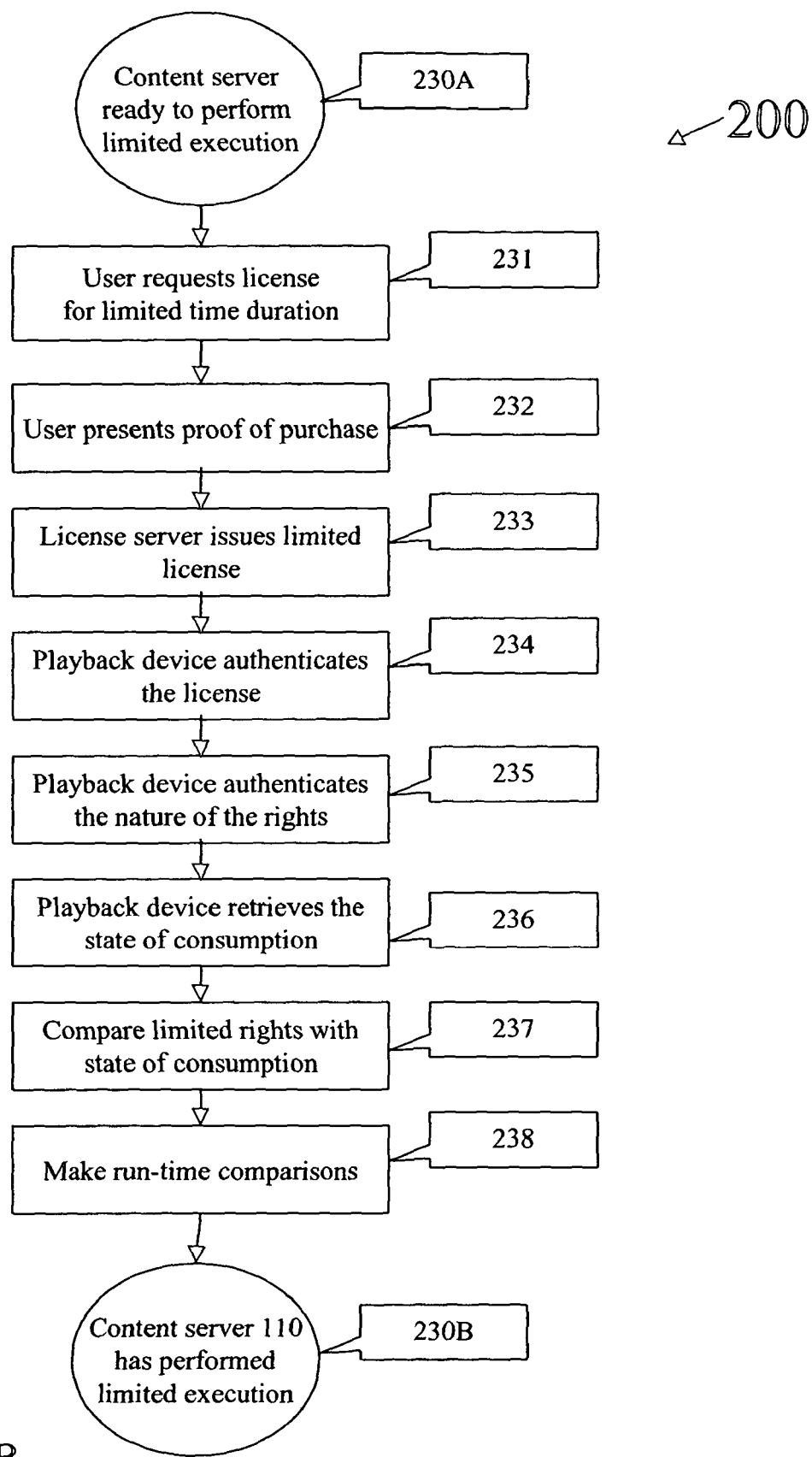

FIGS. 2a and 2b show a process flow diagram of a method of operating the system including dynamic assignment of rights to content in a closed distribution system.

Although described serially, the flow points and steps of the method 200 can be performed by separate elements in conjunction or in parallel, whether asynchronously or synchronously, in a pipelined manner, or otherwise. There is no particular requirement that the method 200 must be performed in the same order in which this description lists flow points or steps, except where explicitly so indicated.

Delivery of Conditional License

At a flow point 210A, the license server 140 is ready to deliver one or more conditional licenses 142 to one or more secure processors 130.

At a step 211, the license server 140 determines information for an individual conditional license 142 for a selected secure processor 130, including an "IF" condition and a "THEN" portion of a data structure for that conditional license 142.

As described above, the "IF" condition might be prepared to be executed substantially locally (that is, at the secure processor 130) or might be prepared to be executed substantially remotely (that is, at one or more license servers 140).

As described above, the "THEN" portion might be prepared to be maintained substantially locally (that is, stored at the secure processor 130) or might be prepared to be maintained substantially remotely (that is, generated at one or more license servers 140).

At a step 212, the license server 140 delivers the conditional license 142 to the secure processor 130. As part of this step, in one embodiment, the license server 110 delivers this information to the secure playback device 130 using a secure infrastructure overlaid on the communication system 150.

At a flow point 210B, the system 100 has delivered one or more conditional licenses 142 to one or more secure playback devices 130, and is now ready to perform another task.

Invoking Conditional Licenses

At a flow point 220A, the secure processor 130 is ready to use the content 112.

At a step 221, the secure processor 130 retrieves the content 112 from storage it maintains substantially locally. In one embodiment, the storage might be secure storage maintained on the same chip as the secure processor 130, or might be substantially local storage on which the secure processor 130 maintains the content 112, digitally signed and encrypted, with the effect that the content 112 is secure against prying and tampering.

At a step 222, the secure processor 130 determines if the user has a license 142 effective to permit the user to execute or present the content 112. If the user has a license 142 effective to permit the user to execute or present the content 112, the secure processor 130 allows that operation to proceed, and the method 200 continues with the flow point 220B. If the user has a conditional license 142 with a "THEN" portion effective to permit the user to execute or present the content 112, the method 200 proceeds with the next step.

At a step 223, the secure processor 130 determines if the "IF" condition for the conditional license 142 is satisfied.

As part of this step, if as described above, the "IF" condition is prepared to be executed substantially locally (that is, at the secure processor 130), the secure processor 130 proceeds to execute or interpret the "IF" condition and determine a yes/no answer regarding whether the "IF" condition for the conditional license 142 is satisfied.

As part of this step, if as described above, the "IF" condition is prepared to be executed substantially remotely (that is, at one or more license servers 140), the secure processor 130 proceeds to make the associated call or invocation or request of a designated license server 140, and retrieves from that license server 140 a yes/no answer regarding whether the "IF" condition for the conditional license 142 is satisfied.

If the "IF" condition is satisfied, the method 200 proceeds with the next step. If the "IF" condition is not satisfied, the secure processor 130 does not allow execution or presentation of the content 112 to proceed, and the method 200 continues with the flow point 220B.

At a step 224, the secure processor 130 determines what rights are granted by the "THEN" portion of the conditional license 142.

As part of this step, if as described above, the "THEN" portion is prepared to be maintained substantially locally (that is, stored at the secure processor 130), the secure processor 130 determines the rights granted by the "THEN" portion of the conditional license 142.

As part of this step, if as described above, the "THEN" portion is prepared to be maintained substantially remotely (that is, generated at one or more license servers 140), the secure processor 130 proceeds to make the associated call or invocation or request of a designated license server 140, and retrieves from that license server 140 a description of a set of rights granted by the "THEN" portion of the conditional license 142.

The method 200 proceeds with the step 222, at which the secure processor 130 examines the rights granted by the "THEN" portion of the conditional license 142. As described above, the rights might themselves be conditional. If so, it might occur that the method 200 performs the steps 222, 223 and 224 repeatedly until rights associated with all satisfied "IF" conditions have been examined.

At a flow point 220B, the secure processor 130 has used the content 112 and records the state of that content 112. As described above, the state might include a score, a high score, a time taken, a minimum time taken, or another data structure, such as for example some other measure of player success at a game. The method 200 is ready to proceed with another task.

Limited Game Execution

At a flow point 230A, the content server 110 is ready to perform limited execution of an item of content 112.

The secure processor 130 determines whether the limitation on execution is a time limitation or a limitation on the number of games.

In one embodiment, the playback device 130, within a secure sub-portion thereof, such as for example the secure processor, includes hardware and software elements which in combination provide abilities to start a game (or other content 112), stop a game, and measure the amount of execution time of a game.

In one embodiment, the playback device 130, also within a secure sub-portion thereof, such as for example the secure processor, includes hardware and soft-ware elements which in combination provide abilities to save and restore a limited exectuion rights of a game (or other content 112), and measure the a degree of consumption of the state of the game. For a first example, not intended to be limiting in any way, the playback device 130 might maintain the number of minutes of play for the specific content 112, identified for the specific content 112, in a secure memory (such as for example an internal flash memory within the secure sub-portion). For a second example, not intended to be limiting in any way, the playback device 130 might maintain that information in a memory external to the secure sub-portion, but digitally signed (and possibly encrypted) using a cryptographic technique, with the effect that the saved state of the game cannot be easily altered (and in some embodiments, cannot be easily read), by devices other than the playback device 130.

At a step 232, a user of the playback device 130 requests a license 142, specific to the specific playback device 130, for a selected limited time duration.

At a step 233, the user presents an appropriate proof of purchase or other credit or entitlement to obtain the license 142.

At a step 234, the license server 140 issues a limited license 142, the limited license 142 including a description of the nature of the rights granted by that limited license 142. In one embodiment, the description of the nature of the rights is encoded using a protocol known to both the playback device 130 and to the license server 140.

At a step 235, the playback device 130 authenticates the license 142 using appropriate digital signature checking techniques, and prepares to initiate or launch the game (or other content 112).

At a step 236, the playback device 130 authenticates the description of the nature of the (limited) rights granted by the license 142 using appropriate digital signature checking techniques, and makes description available to the secure processor.

At a step 237, the playback device 130 retrieves the (saved) state of the consumption of the rights of the game (or other content 112). For example, it could retrieve the actual minutes of execution of the game.

At a step 238, the playback device 130 compares the limitations imposed by the license 142, such as for example a time limitation, with information regarding the amount of consumption of the content 112 from the saved state of consumption the game (or other content 112). If the amount of consumption exceeds the allowed limit, the game is not permitted to launch (for example, the launch is aborted).

At a step 239, the playback device 130 makes run-time comparisons from time to time regarding the limitations imposed by the license 142, such as for example a time limitation, with information regarding the amount of consumption of the content 112 from the saved state of the game (or other content 112). If, at any of these run-time comparisons, the amount of consumption exceeds the allowed limit, the game (or other content 112) is aborted or halted.

Run-time comparisons might be performed by one of at least two techniques. (A) In a first example technique, the game makes periodic secure program calls to a secure set of code embodied in the secure processor, and using a secure timer in the processor accumulates the time consumption of the content being executed, with the effect that the secure processor can determine when the amount of consumption exceeds the limit. (B) In a second example technique, the secure processor sets a secure timer interrupt from the game at the time of launch into a secure set of code embodied in the secure processor, similarly with the effect that the secure processor can determine when the amount of consumption exceeds the limit.

In cases where the limitation is a limitation on the number of games, the secure processor may operate in a similar manner. In such embodiments, instead of the secure processor comparing an amount of time used against a selected time limit, the secure processor would compare a number of times launched against a selected limit on the number of launches.

At a flow point 230B, the content server 110 has performed limited execution of an item of content 112.

Alternative Embodiments

Although preferred embodiments are disclosed herein, many variations are possible which remain within the concept, scope, and spirit of the invention. These variations would become clear to those skilled in the art after perusal of this application.

After reading this application, those skilled in the art would recognize that the techniques described herein provide an enabling technology, with the effect that heretofore advantageous features can be provided that heretofore were substantially infeasible.

For example, not intended to be limiting in any way, the techniques described herein provide that contests or games might be conducted, with the effect that one or more winners (as determined, for example, in response to relative scores or relative times taken) of the contest or game would receive an appropriate prize, such as for example: a bonus game, a set of bonus "levels" or other modules for a game, a cash prize, a credit toward purchase of a new or upgraded game, and the like. In various embodiments, the contest or game might include one winner, or more than one winner, or one or more winners of more than one class of winners, and the like. In various embodiments, the contest or game might include a team of players whose joint score is responsive to the individual scores of the team members, such as a sum or median of those scores or a maximum one or more of those scores. In various embodiments, the original game, the bonus game, or both, might include provisions for individual play, for joint play, or for cooperative play.

For example, not intended to be limiting in any way, an entity not associated with the original author or distributor of the game might provide a contest (either with or without entry requirements), in which superior play of the original game is rewarded with an update to that game. The update might or might not be created by the original author or distributor of the game, the entity conducting the contest, or otherwise.

For example, not intended to be limiting in any way, the techniques described herein provide that games already available to the user in the closed system might be upgraded, such as by alteration or emendation, without any particular requirement of rewriting code for the original game, or for having access to that original code. In various embodiments, the game might be upgraded by providing a new program that checks the state of the old game, and makes changes in the behavior of the old game, either by directly interacting with the user, or by altering the state information of the old game (with the intercession of the security system), or some combination or conjunction thereof. For example, not intended to be limiting in any way, an entity not associated with the original author or distributor of the game might provide an updated, upgraded, modified, or otherwise different, version of the game, or a new "level" or other module for the game, without altering any of the original game code. The new game might be created in response to status information maintained or provided by the old game, or the new game might call upon aspects of the old game (with the intercession of the security system) to provide a new game that is either different from, or an enhanced version of, the old game.

For example, not intended to be limiting in any way, the techniques described herein provide that educational software might be altered or amended to provide for an appropriate prize or reward for successful learning, such as for example: a right to play a game program (either generically or limited to a selected period of time), a right to play bonus "levels" or other modules for a game, a cash prize, a credit toward purchase of a new or upgraded game, a next or another educational program "level" or other module for the educational program, a credit toward purchase of a new educational program, and the like.

For example, not intended to be limiting in any way, the techniques described herein provide for security checks before accessing critical or otherwise sensitive data, such as for example confidential business information, confidential personal information, confidential financial information, program code, trade secrets, and the like.

For example, not intended to be limiting in any way, the techniques described herein provide for a chain (whether sequential or organized as a directed graph, with either conditional or unconditional transfers at each edge of that directed graph) events for the system to watch for, and in response thereto, take action on. For example, reaching a selected state in a first game program might provide the user with the right to play a second game, reaching a selected state in the second game program might provide the user with the right to play a third game, and the like.

After reading this application, those skilled in the art will recognize that these alternative embodiments and variations are illustrative and are intended to be in no way limiting.

The invention claimed is:

1. A method comprising:
providing first content for a playback device;
providing a license that includes rights for the first content and a rule associated with a state of execution of the first content;
executing, according to the rights for the first content, the first content on the playback device to reach a state of execution of the first content;
saving the state;
stopping execution of the first content;
determining rights or permissions for second content based on the saved state and the rule associated with the state of execution, wherein the first content and the second content are distinct;
launching the second content for execution.

2. The method of claim 1, wherein the second content includes the first content.

3. The method of claim 1, further comprising:
measuring consumption of content using a secure processor;
maintaining a value associated with the measured consumption in secure internal memory;
comparing the value with quantities associated with the rights or permissions;
enforcing the rights or permissions with the secure processor based on the comparison.

4. The method of claim 1, further comprising:
measuring consumption of content using a secure processor;
maintaining a value associated with the measured consumption in cryptographically secure mass storage;
comparing the value with quantities associated with the rights or permissions;

enforcing the rights or permissions with the secure processor based on the comparison.

5. The method of claim 1, further comprising:
measuring consumption of content using a secure processor;
maintaining a value associated with the measured consumption;
comparing the value with quantities associated with the rights or permissions in runtime using a secure timer interrupt that is set up at content launch;
executing secure code at interrupt intervals to perform the comparison.

6. The method of claim 1, further comprising:
executing secure code at interrupt intervals;
calling a secure set of code in the secure processor during an interrupt interval;
measuring consumption of content using a secure timer at the interrupt interval;
determining when the measured consumption exceeds a threshold associated with the rights or permissions;
limiting the rights or permissions when the measured consumption is determined to exceed the threshold associated with the rights or permissions.

7. The method of claim 1, further comprising:
accepting input from a super-user;
restricting rights or permissions for the second content based on the input.

8. The method of claim 7, further comprising using a resident rule associated with the input from the super-user.

9. The method of claim 7, further comprising restricting rights or permissions for the second content based upon the input from the super-user.

10. The method of claim 7, further comprising saving the super-user input, wherein the license includes a rule that is used to interpret the super-user input.

11. The method of claim 1, further comprising:
determining state of past transactions, wherein the past transactions are associated with content on the playback device;
providing a license to the playback device for the content based on the state of past transactions.

12. The method of claim 1, wherein the playback device is a secure playback device, further comprising enforcing the rights or permissions using trusted software.

13. The method of claim 1, further comprising receiving information associated with the rights or permissions from a license server.

14. The method of claim 1, further comprising:
determining rights or permissions locally by combining, according to the rule associated with the state of execution, one or more items selected from the group consisting of:
static rights from a server, static resident rights at the playback device, dynamic inputs to the playback device, and state on the playback device.

15. The method of claim 1, further comprising determining rights or permissions remotely.

16. The method of claim 1, further comprising enforcing time-limited play.

17. The method of claim 1, wherein the rights or permissions are encapsulated as data, rules, or codified instructions in a conditional license.

18. The method of claim 1, wherein the rights or permissions are conditionally granted depending upon a set of inputs that may vary each time a conditional license associated with the rights or permissions is evaluated.

19. The method of claim 1, wherein the first content is media content, further comprising:
determining state data from a player of media on a playback device;
granting rights or permissions to the player for the media based on the state data.

20. The method of claim 1, wherein the first content is game content, further comprising:
saving game state data related to state of execution of the game content;
granting rights or permissions for the game based on the game state data.

21. The method of claim 20, wherein the game state data includes data selected from the group consisting of duration of play, number of times the game has been played, progress of play, assets, score, a combination thereof.

22. The method of claim 20, further comprising receiving dynamic inputs from a player that influence the rights or permissions to the player.

23. The method of claim 1, further comprising requesting the second content after determining rights or permissions for the second content based on the saved state.

24. The method of claim 1, further comprising providing the second content.

25. The method of claim 1, further comprising:
providing a license, based on prior transactions, for the second content.

26. The method of claim 1, further comprising
determining state of past transactions, wherein the past transactions are associated with content on the playback device;
providing a license to the playback device for new content based on the state of past transactions.

27. The method of claim 1, further comprising determining rights or permissions locally by combining static rights with dynamic rights, wherein the dynamic rights are related to the state of execution of the first content.

28. The method of claim 1, wherein the first content is game content, wherein the data related to the state of execution of the game content includes data pertaining to the game content, and wherein granting rights or permissions for the game content is based on the game state data.

29. The method of claim 1, wherein the determining rights or permissions for the second content further includes interpreting the saved state in the context of the first content.

30. The method of claim 1, wherein the license that includes the rights for the first content includes the license that includes the rights for the second content.

31. The method of claim 1, wherein providing the license that includes the rights for the first content and providing the license that includes the rights for the second content are accomplished in a single transaction.

32. The method of claim 1, further comprising interpreting permissions associated with the second content based on the saved state.

33. The method of claim 1, further comprising:
processing game state data from a player of a game;
cryptographically authenticating the game state data;
granting rights or permissions associated with the game to the player based on the game state data.

34. A system comprising:
a means for providing first content for a playback device;
a means for providing a license that includes rights for the first content;

a means for executing, according to the rights for the first content, the first content on the playback device to reach a state of execution of the first content;

a means for recording the state;

a means for stopping execution of the first content;

a means for determining rights or permissions for second content based on the saved state and a rule associated with the state of execution, wherein the first content and the second content are distinct;

a means for launching the second content for execution.

35. The system of claim 34, further comprising:

a means for processing game state data from a player of a game including the first content;

a means for cryptographically authenticating the game state data;

a means for granting rights or permissions associated with the game including the second content to the player based on the game state data.

36. The system of claim 34, further comprising:

a means for processing game state data from a player of a first game associated with the first content;

a means for cryptographically authenticating the game state data;

a means for granting rights or permissions associated with a second game associated with the second content to the player based on the game state data.

37. The system of claim 34, wherein the rule comes from the license.

38. The system of claim 34, wherein the rule comes from a license to the second content.

* * * * *